United States Patent
Ohnami

[19]

[11] Patent Number: 6,144,799
[45] Date of Patent: Nov. 7, 2000

[54] METHOD AND APPARATUS OF RETRIEVING VOICE CODED DATA AND MOVING IMAGE CODED DATA

[75] Inventor: Yuuichi Ohnami, Iruma, Japan

[73] Assignee: Hitachi Denshi Kabushiki Kaisha, Tokyo, Japan

[21] Appl. No.: 08/862,409

[22] Filed: May 23, 1997

[30] Foreign Application Priority Data

May 24, 1996 [JP] Japan ................................ 8-129742

[51] Int. Cl.[7] .................................................. H04N 5/91
[52] U.S. Cl. ...................... 386/68; 386/75; 375/240.03
[58] Field of Search ............................ 386/68, 81, 82, 386/111, 112, 75, 33, 6–8; 348/405, 407; 375/240.03; H04N 5/91

[56] References Cited

U.S. PATENT DOCUMENTS

| | | | |
|---|---|---|---|
| 5,122,875 | 6/1992 | Raychaudhuri et al. | 348/390 |
| 5,136,376 | 8/1992 | Yagasaki et al. | 348/384 |
| 5,570,199 | 10/1996 | Tanaka et al. | 386/95 |
| 5,615,018 | 3/1997 | Wu et al. | 386/68 |
| 5,657,416 | 8/1997 | Boon | 386/109 |
| 5,686,962 | 11/1997 | Chung et al. | 348/402 |
| 5,686,964 | 11/1997 | Tabatabai et al. | 348/420 |
| 5,699,119 | 12/1997 | Chung et al. | 348/405 |
| 5,754,728 | 5/1998 | Nakajima et al. | 386/68 |

*Primary Examiner*—Wendy Garber
*Assistant Examiner*—Vincent F. Boccio
*Attorney, Agent, or Firm*—Antonelli, Terry, Stout & Kraus, LLP

[57] ABSTRACT

There is provided retrieving method and apparatus for performing automatic search for a necessary search point by analyzing coded data without decoding it. Voice/moving image compressed data recorded on a recording/reproducing device is sequentially read at a high speed, code quantities and coding process parameters of individual pictures in the moving image compressed data are detected to analyze a feature of each picture, voice coding process parameters are detected from voice compressed data to analyze a feature of each voice, deciding, on the basis of results of analysis of voice and picture, whether the retrieved data is a point to be searched, and when a search point is determined, the recording/reproducing device is controlled such that corresponding voice/moving image compressed data is read at a standard speed and the read-out data is decoded to perform automatic search for desired voice/moving image coded data.

9 Claims, 10 Drawing Sheets

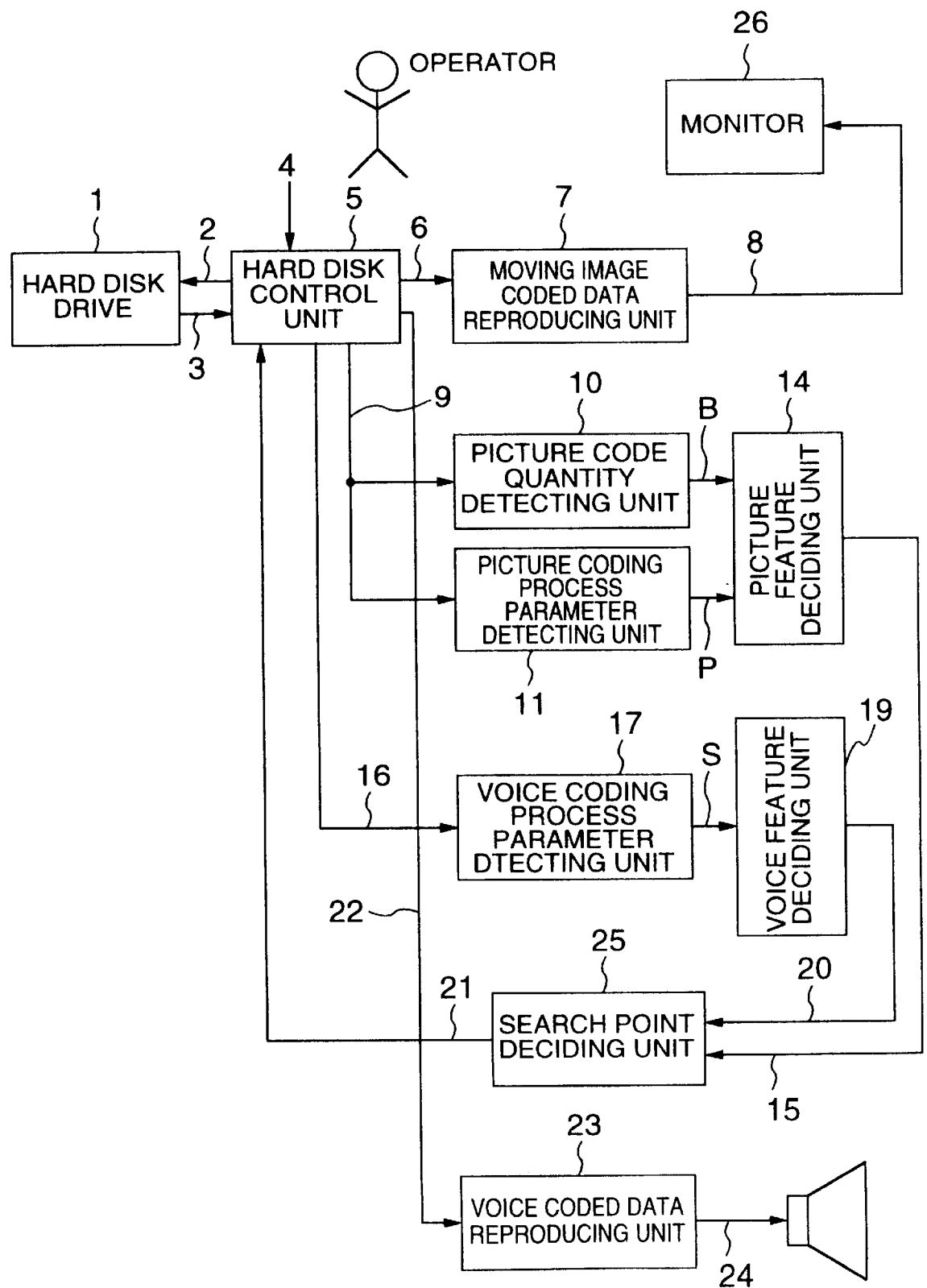

(CONTENTS OF MOVING IMAGE CODED DATA)

(RETRIEVAL CONDITIONS)

AUDIO FRAME

| HEADER 32 BITS | ERROR CHECK DATA 16 BITS | BIT ASSIGNING INFORMATION | SCALE FACTOR | SAMPLE |

AUDIO FRAME LENGTH (BITS)=
384×DATA RATE OF VOICE CODED DATA÷SAMPLING FREQUENCY

METHOD AND APPARATUS OF RETRIEVING VOICE CODED DATA AND MOVING IMAGE CODED DATA

BACKGROUND OF THE INVENTION

The present invention relates to voice/image processing techniques and more particularly to method and apparatus of retrieving compressed data.

In recent years, voice/moving image coding systems (MPEG1:ISO/IEC 11172, MPEG2:ISO/IEC 13818 and the like) have been standardized and the number of applications has increased in which compressed data is stored in, for example, a hard disk. In this type of application, a technique of retrieving the contents of the coded data plays an important role.

For example, in an application of a supervisory system, a voice/moving image from a supervisory camera is coded (compressed) and is transmitted to a location where a supervisor is present through a transmission path. On the receiving side, the transmitted voice/moving image coded data is decoded (expanded) and is delivered to a loudspeaker or a monitor as well as being recorded on a hard disk. When an object being supervised is desired to be analyzed in detail later, necessary data must be retrieved from a plurality of coded data pieces which have been recorded as above.

Generally, in a conventional technique applicable to this case, the contents of each moving image coded data piece is confirmed by utilizing the high-speed reproduction function of the retrieving system. The moving image coded data consists of coded data pieces of sequential pictures (or frames) and therefore, the high-speed reproduction is realized by jumping a plurality of pictures to perform thin-out reproduction.

On the other hand, in VOD (Video On Demand), for example, a great number of moving image coded data pieces are stored and when necessary moving image coded data is desired to be retrieved, it is usual to first determine the necessary data from its title name or a preset representative image. But more detailed contents is again confirmed by utilizing the aforementioned high-speed reproduction.

SUMMARY OF THE INVENTION

The retrieval based on the high-speed reproduction will be described by way of concrete example with reference to FIGS. 2A and 2B. These figures diagrammatically show retrieval conditions in a system for supervising the behavior of eruption of a volcano, with FIG. 2A illustrating an example of display images of a specified number of pictures in a plurality of recorded moving image coded data pieces and FIG. 2B diagrammatically illustrating a state of a plurality of aligned pictures for retrieval, where hatched pictures represent pictures to be reproduced which are thinned out during high-speed reproduction.

Generally, in this type of retrieval, a retrieval operator confirms those images that are illustrative of eruption in accordance with the procedure as below to decide whether moving image coded data of the images is necessary data. The image necessary for decision will hereinafter called a decision image or a search point.

(1) Visual search is carried out through high-speed reproduction until an image illustrative of eruption is displayed.

(2) At the time that the image illustrative of eruption is visually confirmed, the high-speed reproduction is changed to standard reproduction and the necessity is decided.

(3) Visual search is carried out through high-speed reproduction until an image illustrative of next eruption is displayed.

(4) At the time that the image illustrative of next eruption is visually confirmed, the high-speed reproduction is changed to standard reproduction and the necessity is decided.

As described above, the main contents of retrieval is to search a decision image (in the case of FIG. 2, an image illustrative of eruption) for making a decision on the necessity of moving image coded data and to decide the necessity based on the decision image. In the general conventional technique, high-speed reproduction is utilized for the search for the decision image.

The high-speed reproduction is, however, realized regardless of the contents of moving image coded data by jumping a predetermined number of pictures to perform thin-out reproduction. Generally, in recorded moving image coded data, it is frequent that decision images form only a part of the whole images. Accordingly, in the conventional retrieval utilizing the high-speed reproduction, most of the time required for the retrieval is consumed to carry out personal search for decision images, thus making it impossible to realize efficient retrieval. Further, since the operator personally confirms whether the picture is of a decision image by watching pictures, a human error of overlooking a necessary image will conceivably be made.

Conventionally, to solve this problem, a technique has been proposed which permits automatic search for a decision image. According to this conventional technique, a change in the contents between images is calculated on the basis of uncompressed data, that is, decoded (expanded) data and an image subject to a large change is determined to be a decision image. More specifically, a difference in pixel value is calculated between an object image and a temporally preceding image and when the difference value is large, the object image is determined to be a decision image. This automatic search, however, performs the process on the basis of uncompressed data, raising problems that the decoding (expanding) process is indispensable and the amount of operations is increased drastically by the decoding (expanding) process.

In addition, in the conventional techniques, only an image is handled as an object of automatic search and voice is not taken into consideration. Especially, in automatic search based on coded data, any technique of automatic search for image and voice has not yet been available. Generally, a change in image is correlated to a change in voice and hence, the aforementioned automatic search based on only image will prejudice accuracy.

For example, in an eruption supervisory system for volcano as shown in FIG. 2A, even when an external change is not great, an eruptive sound will sometimes be generated inside the volcano and supervision of only an image will disadvantageously lead to a failure to search.

The present invention contemplates elimination of the above conventional problems and it is an object of the present invention to provide coded data retrieval method and apparatus which can perform automatic search for a necessary search point by analyzing coded data without decoding the coded data and can permit more efficient and accurate retrieval.

To accomplish the above object, according to one aspect of the present invention, in retrieval of voice/moving image compressed data recorded in a recording/reproducing device, moving image compressed data is sequentially read out of the recording/reproducing device at a high speed, code quantities and coding process parameters of individual pictures in the moving image compressed data are detected to analyze a feature of each picture, each picture is decided as to its necessity on the basis of a result of the analysis, and when a picture is determined to be necessary, the recording/reproducing device is controlled such that corresponding moving image compressed data is read out at a standard or normal speed and decoded to perform automatic search for a desired moving image coded data piece.

According to another aspect of the present invention, in addition to the above construction, a voice coding process parameter is detected from voice compressed data which is sequentially read from the recording/reproducing device at high speeds, to analyze a feature of the voice, the retrieved data is decided, on the basis of a result of the analysis of the voice and the analysis result of the picture, as to whether to be a point to be searched, and when the voice is determined to be a search point, the recording/reproducing device is controlled such that corresponding voice/moving image compressed data is read at a standard speed and decoded to perform automatic search for desired voice/moving image coded data piece.

Generally, a decision part i.e. data based on which decision is made, used when the contents of voice coded data and the contents of moving image coded data are retrieved is often an image at which the pattern or the scene is changed on time axis or a part at which voice is changed on time axis. For example, a part illustrative of eruption of a volcano or a part at which an eruptive sound is generated is used as a decision part. The code quantity and the coding process parameter (quantizing step value) of each picture in the moving image coded data directly affect a pattern or scene of the picture. The voice coding process parameter (bit assigning information and a scale factor) in the voice coded data also directly affect the state of voice.

In accordance with a feature of the present invention, a code quantity and a coding process parameter of each picture are sequentially detected from the moving image coded data to decide a change in pattern or scene, a voice coding process parameter is also detected from the voice coded data to decide a state of voice or a change in voice, and automatic search for a search point is ensured on the basis of the decision results.

After voice/moving image compressed data corresponding to an initial search point is read at a standard speed, decoded and delivered, voice/moving image compressed data may again be read out of the recording/reproducing device at a high speed in response to a command by the operator to perform next retrieval and next search point may be retrieved.

According to still another aspect of the present invention, in retrieval of voice/moving image compressed data recorded on a recording/reproducing device, voice/moving image compressed data is sequentially read out of the recording/reproducing device at a high speed, code quantities and coding process parameters of individual pictures in the read-out moving image compressed data are detected to analyze a feature of each picture, coding process parameters of individual audio frames are detected from the read-out voice compressed data to analyze a feature of each voice, each picture and each voice are decided as to whether they are required to be subjected to standard reproduction, and each time that at least one of a voice and a picture which are required to be subjected to standard reproduction is determined, the recording/reproducing device is controlled such that position information of a search point in corresponding compressed data is written in the recording/reproducing device.

With this construction, in connection with voice/moving image compressed data in the recording/reproducing device, all of positions of search points can be detected automatically and position information of a detected search point can be recorded additionally on the recording/reproducing device. When the operator performs retrieval, a desired search point can be accessed instantaneously on the basis of the position information of the search point. Also, all of the search points can be accessed sequentially.

BRIEF DESCRIPTION OF THE DRAWINGS

FIG. 1 is a block diagram showing an embodiment of a voice/moving image retrieving apparatus according to the present invention.

DESCRIPTION OF THE PREFERRED EMBODIMENTS

Figure 2A:
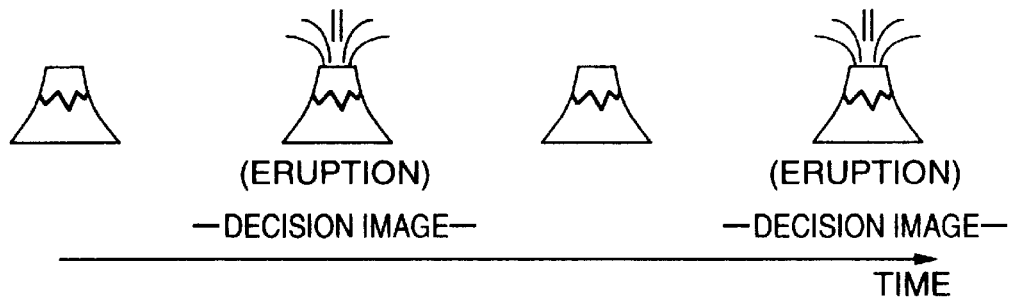
FIGS. 2A and 2B are diagrams for explaining the retrieval operation in the conventional techniques.
Figure 2B:
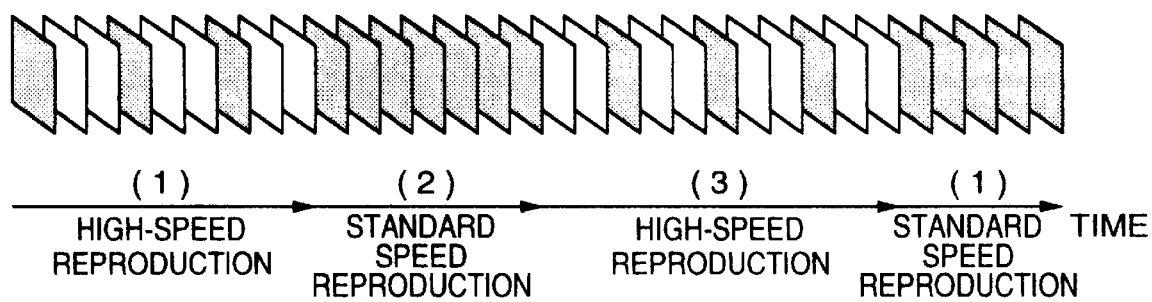

Referring now to FIG. 1, an embodiment of the present invention will be described. A voice/moving image coded data retrieving apparatus according to the present embodiment has a hard disk device or drive 1, a hard disk control unit 5, a moving image coded data reproducing unit 7, a picture code quantity detecting unit 10, a picture coding process parameter detecting unit 11, a picture feature deciding unit 14, a voice coding process parameter detecting unit 17, a voice feature deciding unit 19, a search point deciding unit 25, and a voice coded data reproducing unit 23.

The hard disk device or drive 1 stores voice/moving image coded data to be retrieved. The hard disk device 1 is controlled by control data 2 from the hard disk control unit 5 so as to perform suitable delivery of stored voice/moving image coded data 3 to the hard disk control unit 5.

The hard disk control unit 5 controls the hard disk device 1 on the basis of operation data 4 from an operator and decision data 21 from the search point deciding unit 25. Also, the hard disk control unit 5 delivers moving image coded data 9 taken out of the hard disk device 1 to the picture code quantity detecting unit 10 and picture coding process parameter detecting unit 11 and delivers voice coded data 16, also taken out of the hard disk device 1, to the voice coding process parameter detecting unit 17.

The picture code quantity detecting unit 10 and the picture coding process parameter detecting unit 11 detect a code quantity B and a parameter value P, respectively, from the moving image coded data 9 and deliver them to the picture feature deciding unit 14. The voice coding process parameter detecting unit 17 detects a parameter value S from the voice coded data 16 and delivers it to the voice feature deciding unit 19. Decision data pieces 15 and 20 delivered out of the picture feature deciding unit 14 and the voice feature deciding unit 19, respectively, are fed to the search point deciding unit 25. The search point deciding unit 25 decides, on the basis of the decision data 15 and 20, whether or not the retrieved data are search points and delivers corresponding decision data 21 to the hard disk control unit 5.

Then, the hard disk control unit 5 delivers the moving image coded data 6 and voice coded data 22, picked up through the above control operation, to the moving image coded data reproducing unit 7 and the voice coded data reproducing unit 23, respectively. The moving image coded data 6 is then decoded (expanded) by the moving image coded data reproducing unit 7 into moving image data 8 representative of reproduced data which in turn is delivered to a monitor 26. The voice coded data 22 is also decoded (expanded) by the voice coded data reproducing unit 23 into voice data 24 representative of reproduced data which in turn is delivered to a loud-speaker.

The above operation will now be described in greater detail.

Figure 3:
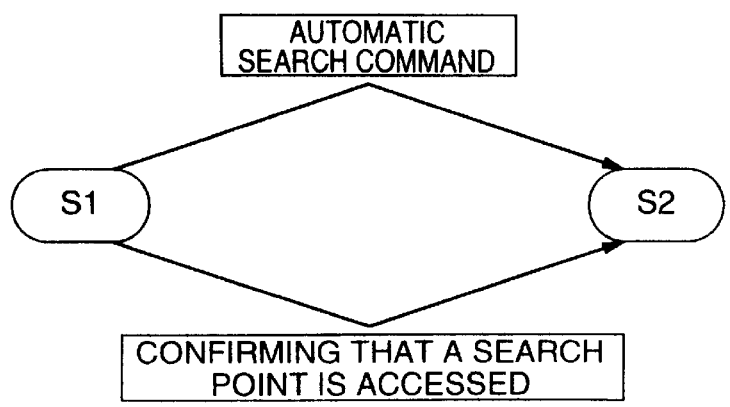
FIG. 3 is a diagram for explaining the operation of a hard disk control unit in the present invention.

Firstly, the hard disk control unit 5 controls the hard disk device 1 through fundamental two states as shown in a state diagram of FIG. 3.

In state S1, the following operation proceeds:

Voice/moving image coded data 3 is sequentially read out of the hard disk device 1 at a standard speed, and the voice/moving image coded data 3 is separated into moving image coded data 6 and voice coded data 22 which are delivered to the moving image coded data reproducing unit 6 and the voice coded data reproducing unit 23, respectively.

The data 6 and 22 are decoded by the moving image coded data reproducing unit 7 and the voice coded data reproducing unit 23, respectively, so that moving image data 8 and voice data 24 are delivered at the standard speed and the contents of these data can be confirmed by the operator through the medium of the monitor and the loudspeaker.

Under the state S1, when the operator then commands an automatic search for a search point by using operation data 4, the hard disk control unit 5 shifts to state S2 of FIG. 3.

In state S2, the following operation proceeds:

Voice/moving image coded data 3 is sequentially read out of the hard disk device 1 at a high speed, the voice/moving image coded data 3 is separated into moving image coded data 9 and voice coded data 16, the moving image coded data 9 is delivered to the picture code quantity detecting unit 10 and picture coding process parameter detecting unit 11, and the voice coded data 16 is delivered to the voice coding process parameter detecting unit 17.

Then, the picture code quantity detecting unit 10 and picture coding process parameter detecting unit 11 detect a code quantity B an a parameter value P in units of a picture, respectively, from the moving image coded data 9 and deliver them to the picture feature deciding unit 14. The picture feature deciding unit 14 performs a feature analysis in accordance with the code quantity B and parameter value P and decides whether or not the retrieved data is a search point for image. A decision result representative of decision data 15 is then delivered to the search point deciding unit 25.

On the other hand, the voice coding process parameter detecting unit 17 detects, from the voice coded data 16, a parameter value S in units of a voice frame and delivers it to the voice feature deciding unit 19. The voice feature deciding unit 19 performs a feature analysis in accordance with the parameter value S and decides whether or not the detected data is at a search point for voice. Then, a decision result representative of decision data 20 is delivered to the search point deciding unit 25.

The search point deciding unit 25 decides, on the basis of the decision data 15 and 20, whether or not the detected data are at a search point and delivers corresponding decision data 21 to the hard disk control unit 5.

The hard disk control unit 5 continues to read data from the hard disk device 1 at the high speed under the state S2 until it recognizes, in accordance with the decision data 21, that the search point is accessed. Then, when access to the search point is recognized, the state shifts to the state S1. In the state S1, voice and image are automatically reproduced at the standard speed through the aforementioned operation. The operator confirms this reproduction by means of the loudspeaker and the monitor and may command an automatic search for next search point, as necessary.

As described above, an automatic search for image as well as voice can essentially be realized without resort to personal search by the operator for a decision image and an efficient and accurate search can be realized. Further, the process can be carried out using the coded data as it is without requiring the decoding process and the amount of operations can be decreased greatly.

Figure 4:
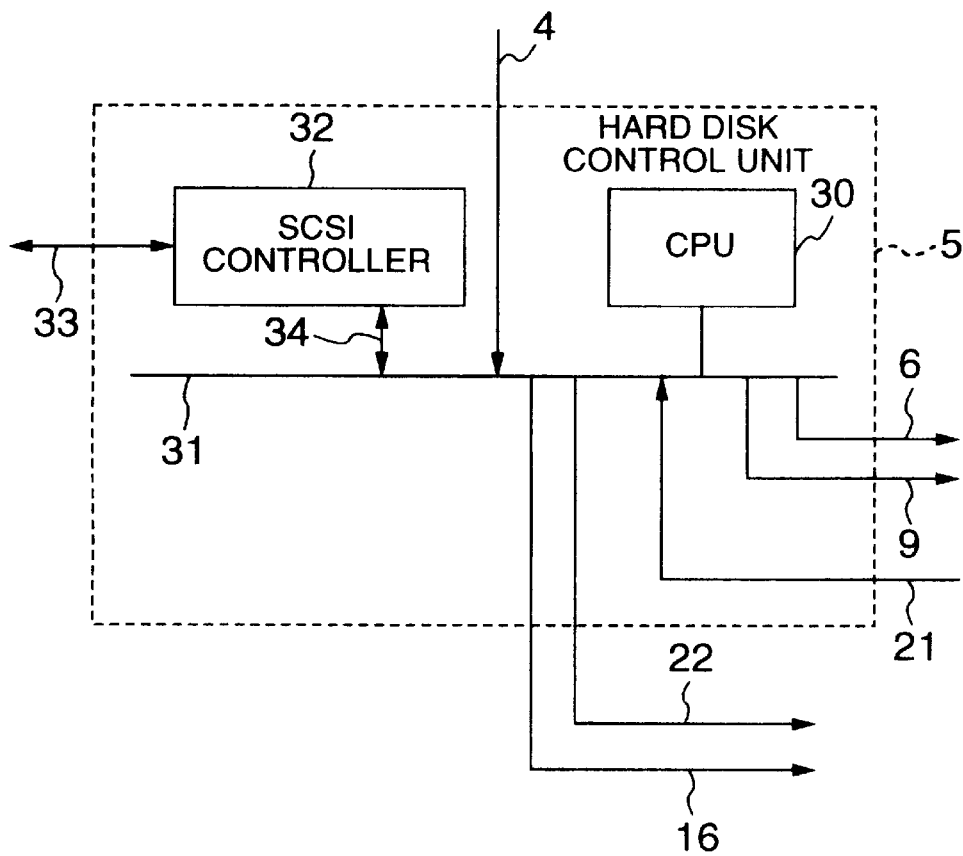
FIG. 4 is a block diagram showing an embodiment of the hard disk control unit in the present invention.

Referring now to FIG. 4, there is illustrated an embodiment of the hard disk control unit 5 which is constructed of a general CPU and a SCSI (Small Computer System Interface) controller representative of a hard disk controller. In this example, the operating data 4, moving image coded data pieces 6 and 9, voice coded data pieces 22 and 16 and decision data 21 are coupled to a bus 31 of the CPU 30. Similarly, data 34 from the SCSI controller 32 is coupled to the bus 31. The control data 2 and voice/moving image coded data 3 in FIG. 1 are represented by SCSI data 33 associated with the SCSI controller 32.

In this embodiment, the aforementioned operation of the hard disk control unit 5 is executed by the CPU 30 and the SCSI controller 32 serves as an interface to the hard disk device 1. The CPU 30 operates to execute the process similar to that shown in FIG. 3.

Next, the picture code quantity detecting unit 10, picture coding parameter detecting unit 11 and picture feature deciding unit 14 will be described more specifically.

Figure 5:
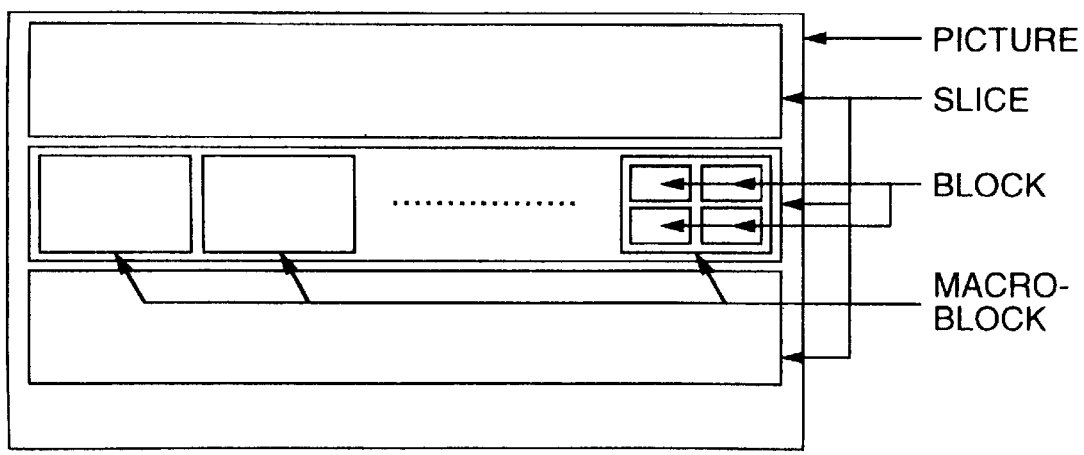
FIG. 5 is a diagram showing a picture hierarchical structure of MPEG 2.

The following description will be given on the assumption that the moving image coded data pieces 6 and 9 are of coded data of MPEG2. A picture of MPEG2 coded data has a hierarchical structure as shown in FIG. 5.

A picture consists of a plurality of slices, each slice consists of a plurality of macro-blocks and each macro-block consists of a plurality of blocks. Unique codes called a picture start code (00000100 in the hexadecimal system) and a slice start code (00000101-000001AF) are set in heading data pieces of the picture and the slice. In association with the macro-block and the block, no unique codes are set in heading data pieces. Further, a unique code called an end code (000001B7) indicative of the end of moving image coded data is set at the end of coded data consisting of a series of pictures.

Presupposing the coded data of MPEG2 as above, the process by the picture code quantity detecting unit 10 will be detailed hereinafter.

The picture code quantity detecting unit 10 sequentially detects code quantities B of individual pictures from moving image coded data 9. On the assumption that an n-th picture is processed at present, that picture is represented by a picture PIC(n) and its code quantity is represented by a code quantity B(n).

Figure 6:
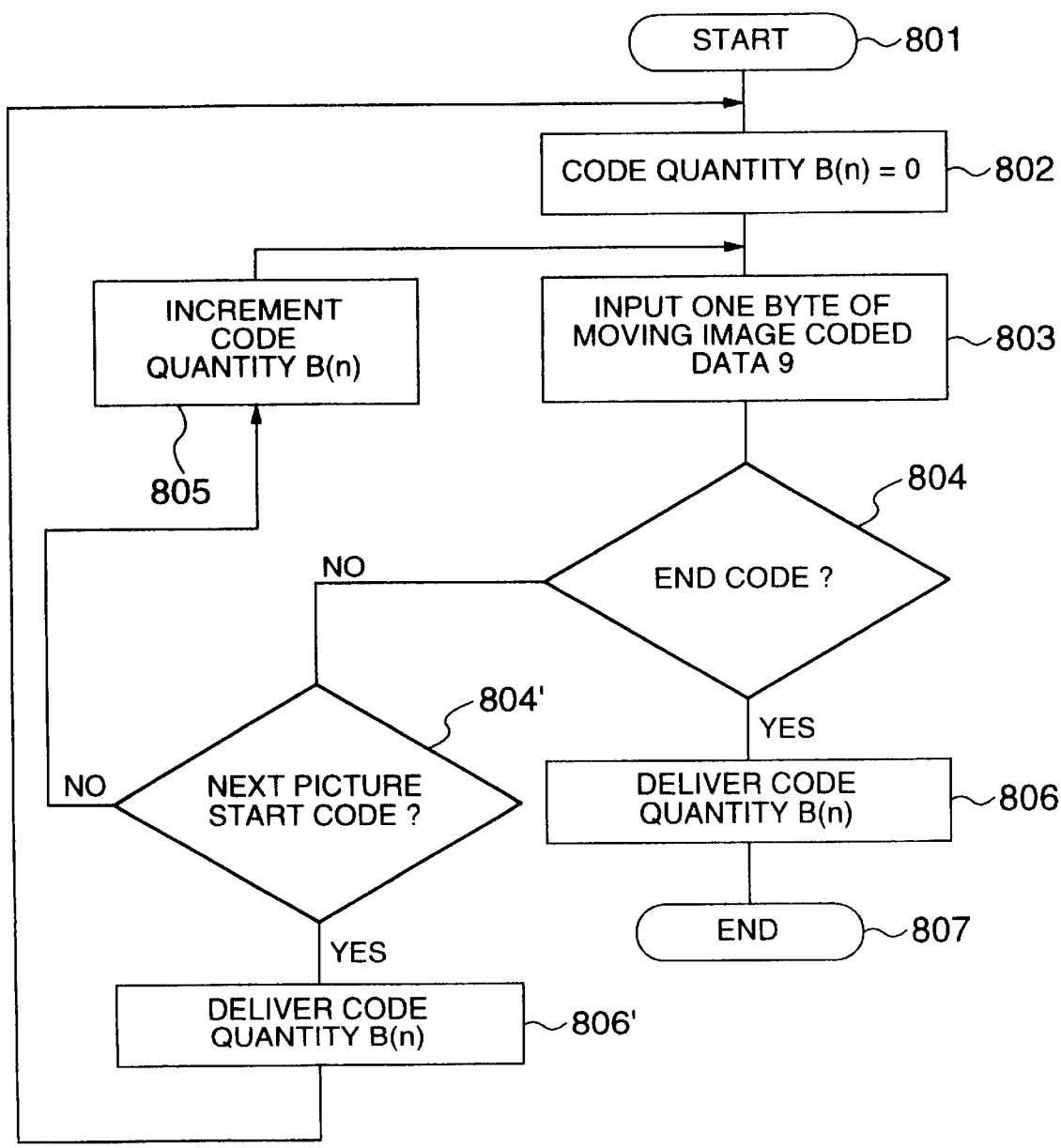
FIG. 6 is a flow chart for explaining the operation of a picture code quantity detecting unit in the present invention.

An example of the contents of the process is shown in FIG. 6. Firstly, in step 802, the code quantity B(n) in the picture code quantity detecting unit 10 is initialized to zero. Next, in step 803, one byte of moving image coded data 9 is inputted. Subsequently, in condition branch step 804, the input data is checked as to whether it is an end code. If NO, the program proceeds to step 804' to check whether it is a next picture start code. If NO, the program proceeds to step 805 in which the code quantity B(n) is incremented and the steps 803 and 804 are again executed.

When YES is issued from the condition branch step 804, indicating that the picture PIC(n) ends, the code quantity B(n) at that time indicates a code quantity of the picture PIC(n). Accordingly, in step 806, that code quantity B(n) is delivered and in step 807, the program ends. Note that if the next start code is detected in step 804', the code quantity B(n) is delivered and steps 802 onwards are executed to detect the code quantity B(m) of a next picture.

On the other hand, the picture coding process parameter detecting unit 11 sequentially detects, from the moving image coded data 9, parameter values P used when the individual pictures are coded.

In the case of the coded data of MPEG2, a quantizing step value or a macro-block type (for example, a field DCT coding macro-block, a frame DCT coding macro-block and so on) corresponds to the parameter value P. As an example, detection of the quantizing step value will be described here. In the MPEG2 coded data, the quantizing step used during the coding process is allowed to be described only in a header of each slice and a header of each macro-block. But the quantizing step value is described only when a quantizing step value is changed to another. In other words, when no quantizing step value is described in a header of a particular macro-block, the quantizing step value of this macro-block is the same as that of the immediately preceding macro-block. Accordingly, when the quantizing step value is the same for all macro-blocks in a slice, that quantizing step value is described in only a header of that slice and is not described in headers of the inner macro-blocks.

Figure 7:
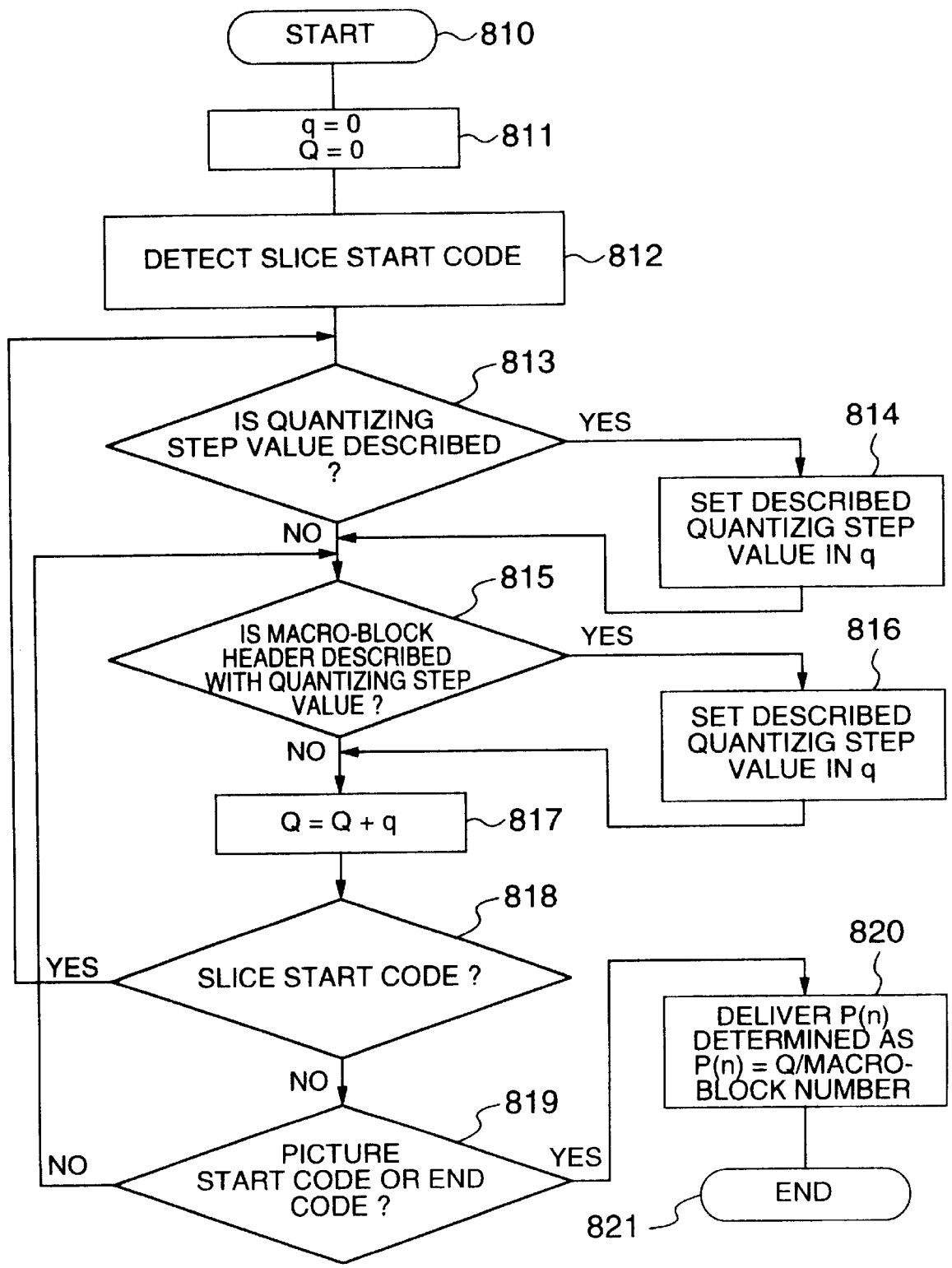
FIG. 7 is a flow chart for explaining the operation of a picture coding process parameter detecting unit in the present invention.

With the coded data of MPEG2 as above, a parameter value (quantizing step value) P of a picture can be determined in steps 810 to 821 of FIG. 7. It is also assumed that an n-th picture is processed at present, the picture is represented by a picture PIC(n) and its parameter value (quantizing step value) is represented by a parameter value (quantizing step value) P(n).

Firstly, in the step 811, q and Q are initialized to zero. The q and Q are variables as below.

q: a variable for setting a quantizing step value of each macro-block

Q: a variable indicative of a product sum of q

Next, in the step 812, an initial slice start code is detected and the heading of the slice is accessed. Then, in the condition branch step 813, it is checked whether a quantizing step value is described in the slice header. If YES, in the step 814, the described quantizing step value is set in the variable q and the program proceeds to the step 815. If NO, the program proceeds directly to the condition branch step 815. In the condition branch step 815, the macro-block header which is a lower hierarchy of the slice is analyzed and it is checked whether the macro-block header is described with a quantizing step value. If YES, in the step 816, the described quantizing step value is set in the variable q and the program proceeds to the process of step 817. If NO, the program proceeds directly to the process of step 817. In the step 817, the set q is subjected to the product sum with Q. Through this, a quantizing step value in one macro-block is detected and is subjected to the product sum.

In the subsequent condition branch step 818, a succeeding code is checked as to whether to be the slice start code. If YES, indicating that the next slice is present, the program again proceeds to the process of condition branch step 813. If NO, the program proceeds to the process of next condition branch step 819 in which a succeeding code is checked as to whether to be the picture start code or the end code. If YES, indicating that the picture PIC(n) ends, the program proceeds to the process of step 820. At the time that the program proceeds to the process of step 820, the sum product of the quantizing step values of individual macro-blocks in the picture PIC(n) is set in the variable Q. If NO, indicating that a further macro-block follows, the program proceeds to the process of condition branch step 815. In the step 820, Q is divided by the number of macro-blocks in the picture PIC(n) to determine an average quantity step value which in turn is set to a parameter value (quantizing step value) P(n) and in the step 821, the program ends.

As described above, the code quantity B of each picture and the parameter value (quantizing step value) P of each picture can be determined.

Next, the operation of the picture feature deciding unit 14 which receives the code quantity B and the parameter value (quantizing step value) P and processes them will be described.

As an example, a feature of picture decided by the picture feature deciding unit 14 indicates complexity of a picture.

Generally, a decision image during retrieval of the contents of moving image coded data is often an image in which the pattern or the scene changes on time axis. For example, a decision image explained in connection with the prior art is illustrative of a part of volcano which erupts and obviously, its pattern changes. In other words, an automatic search for decision image can be accomplished in many cases by noticing a change in complexity of a picture.

Figure 8:
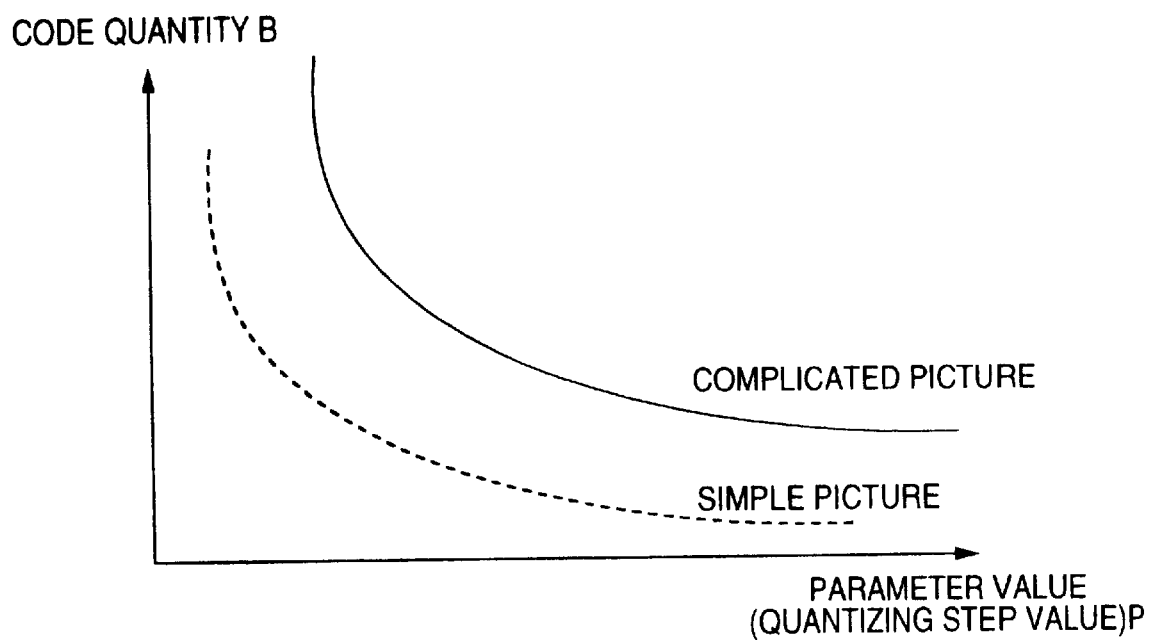
FIG. 8 is a graph showing general examples of the relation between code quantity B and parameter value (quantizing step value).

Referring to FIG. 8, two pictures having different complexity are exemplified and models of general relation between the code quantity B and the parameter value (quantizing step value) P are graphically shown. In the figure, solid line indicates a characteristic curve of a complicated picture and broken line indicates a characteristic curve of a simple picture. Incidentally, these curves resemble a curve pursuant to the following equation (1):

$$B = C/P \qquad (1)$$

where C is constant, and the two curves in FIG. 8 differ from each other because they have different values of C in equation (1). In other words, C is considered to be a value indicative of complexity.

With the above in mind, the picture feature deciding unit 14 calculates the complexity C of each picture from the inputted code quantity B and parameter value (quantizing step value) P in accordance with the following equation (2), compares a calculation result with complexity C of the previous picture, decides on the basis of a difference whether the present picture is a decision image, and delivers a decision result as decision data 15:

$$C = B \times P \qquad (2)$$

Figures 9, 10:
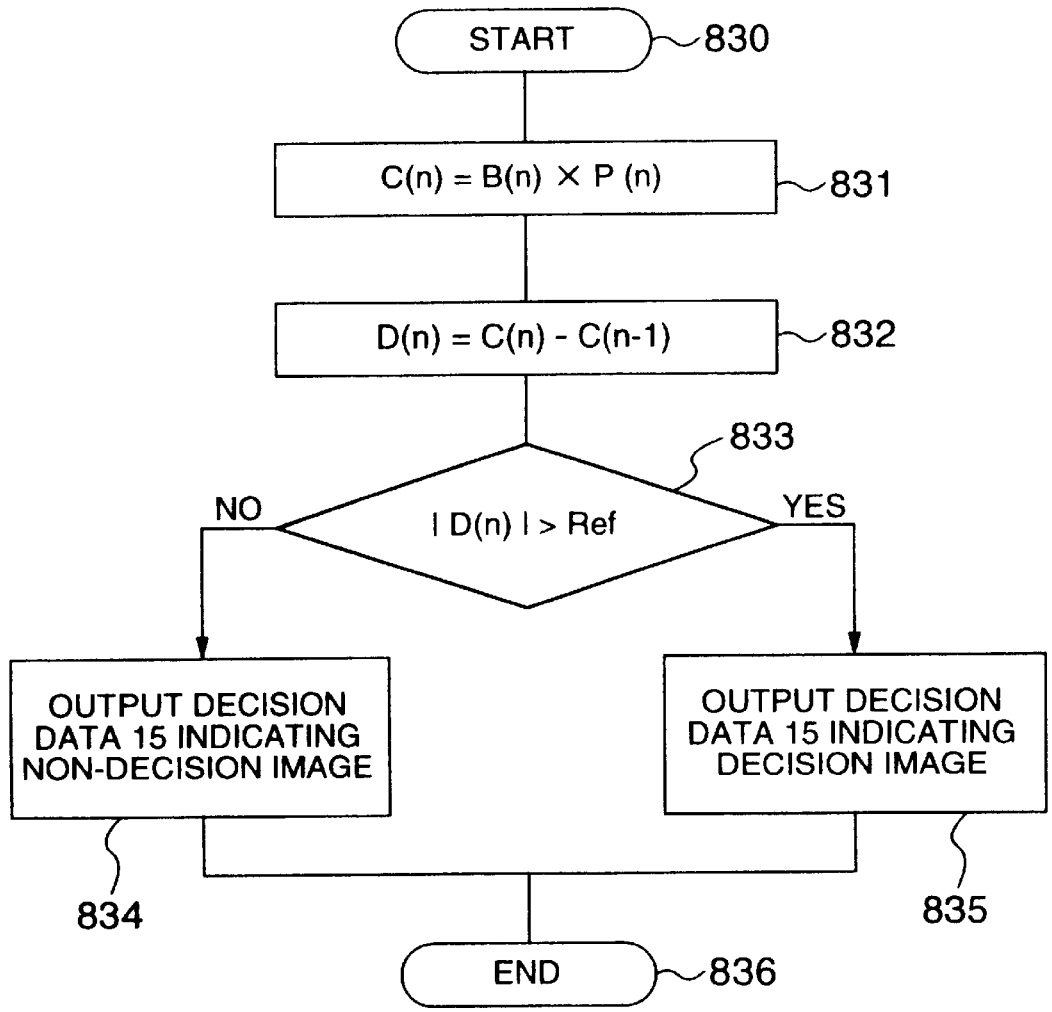
FIG. 9 is a flow chart showing the operation of a picture deciding unit in the present invention.
FIG. 10 is a diagram showing a general structure of audio frame.

An example of the operation of the picture feature deciding unit 14 will now be described with reference to FIG. 9.

Firstly, in step 831, complexity C(n) (e.g. 2500 Kbits) of a picture PIC(n) is determined and in step 832, a difference from complexity C(n−1) (e.g. 3500 Kbits) of the immediately preceding picture PIC(n−1) is determined as difference D(n) (e.g. 1000 Kbits). Then, in condition branch step 833, an absolute value of the difference D(n) is checked as to whether to be larger than a predetermined reference value Ref (e.g. 500 Kbits). The reference value Ref is a value which can be set desirably depending on the system of interest and as this value increases, only pictures which change in complexity to a larger extent can be determined to be decision images.

If YES is issued from the step 833, the program proceeds to the process of step 835 in which decision data 15 (e.g. logical value "1") indicating that the present picture is of a decision image is delivered. If NO, the program proceeds to the process of step 834 in which decision data 15 (e.g. logical value "0") indicating that the present picture is not of a decision image is delivered. Then, the program proceeds from the step 834 or 835 to step 836 in which the process ends.

As described above, according to the present embodiment, the automatic search for a decision image in which the pattern or scene changes can be realized with moving image coded data kept to be compressed, without decoding (expanding) the coded data.

Next, on the assumption that the voice coded data 16 and 22 are of coded data of MPEG1, the process by the voice coding process parameter detecting unit 17 and voice feature deciding unit 19 shown in FIG. 1 will be described.

Firstly, the voice coding process parameter detecting unit 17 detects bit assigning information and a scale factor from each audio (voice) frame of voice coded data 16 and delivers them as a parameter value S. The audio frame has a structure as shown in FIG. 10 including a header of 32 bits, error check data of 16 bits, bit assigning information, a scale factor and a sample.

The audio frame has a fixed data length which is determined depending on a data rate of voice coded data and a sampling frequency. The audio frame length is related to the data rate and the sampling frequency pursuant to the following equation (3):

$$\text{audio frame length (bits)} = 384 \times (\text{data rate of voice coded data}) \div (\text{sampling frequency}) \qquad (3)$$

For example, when the data rate of voice coded data is 384 kbps and the sampling frequency is 48 kHz, the audio frame length is 3072 bits (384 bytes). This value (3072÷384)kbps corresponds to 8 ms in terms of time. In other words, a feature of voice can be decided in these units of the time length.

Figure 11:
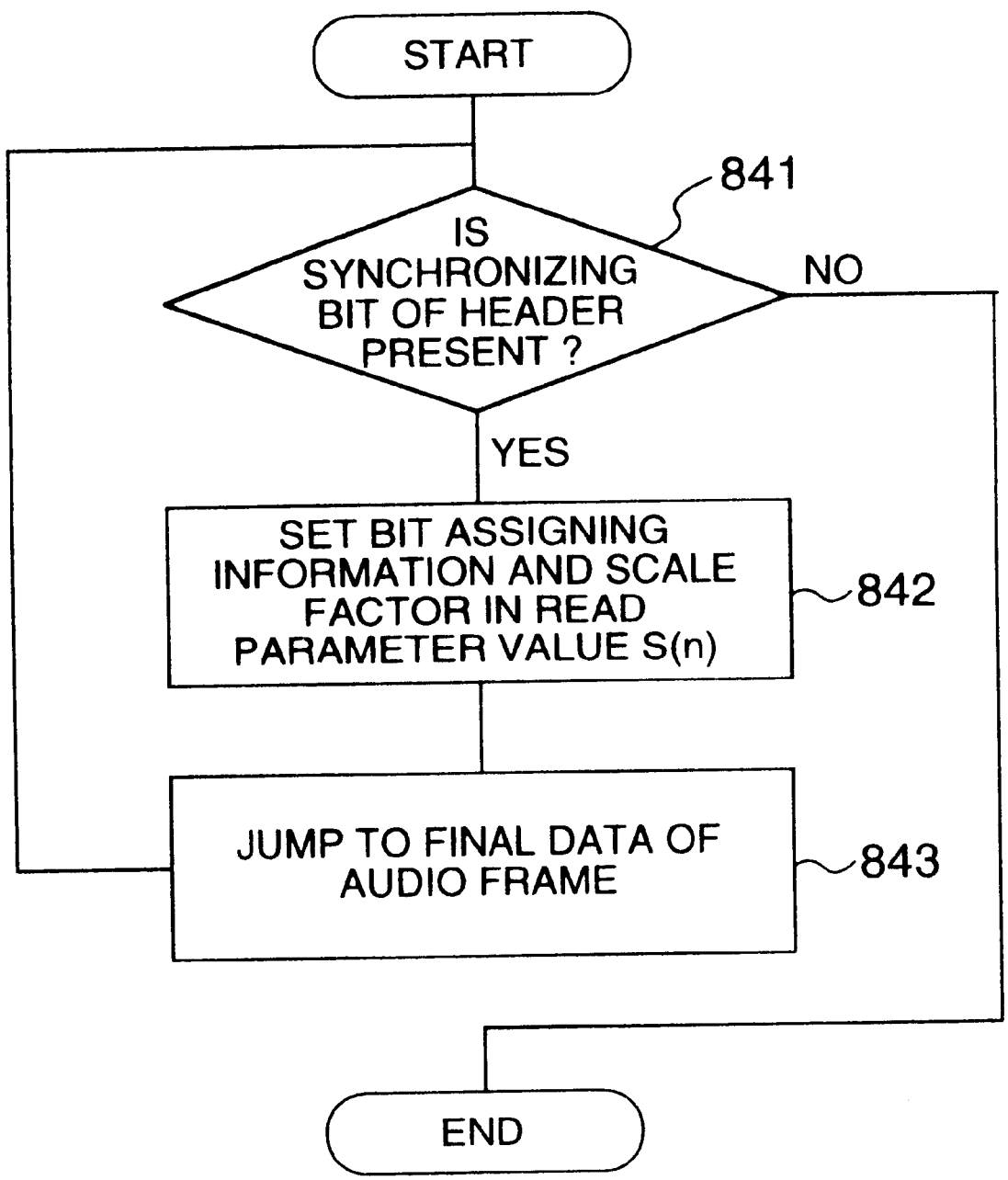
FIG. 11 is a flow chart showing the operation of a voice coding process parameter detecting unit in the present invention.

Thus, the bit assigning information and the scale factor can be detected to provide the parameter value S (S=bit assigning value×scale factor value) through a simple process as shown in FIG. 11.

In FIG. 11, a synchronizing bit of the header is first confirmed in step 841 and if YES (confirmed), the program proceeds to step 842 in which the bit assigning information and the scale factor are read and set in a parameter value S(n). Then, in step 843, the read operation jumps to final data of the audio frame so that the next voice frame may be executed similarly. Here, n designates an audio frame number.

To describe the bit assigning information and the scale factor detected by the voice coding process parameter detecting unit 17, the bit assigning information indicates bits to be assigned to individual frequency components resulting from subband division (32 divisions) of the audio frame, as described in ISO/IEC 11172 which is an MPEG 1 standard. In other words, a frequency component whose value is indicated to be zero by this information is not included in the voice. On the other hand, the scale factor indicates a dynamic range of each frequency component in the audio frame so that the degree of sound volume may be recognized every frequency component.

Next, the process by the voice feature deciding unit 19 will be described.

The voice feature deciding unit 19 receives the parameter value S to decide whether the parameter value S of an object frequency component exceeds a reference level (assuming, for example, the reference level to be 1.5 times the average value, whether the sound volume exceeds 1.5 times the average value is determined) and when it is above the reference level, decision data 20 (for example, logical value "1") indicating that the retrieved voice coded data is a search point is delivered to the search point deciding unit 25.

Figure 12:
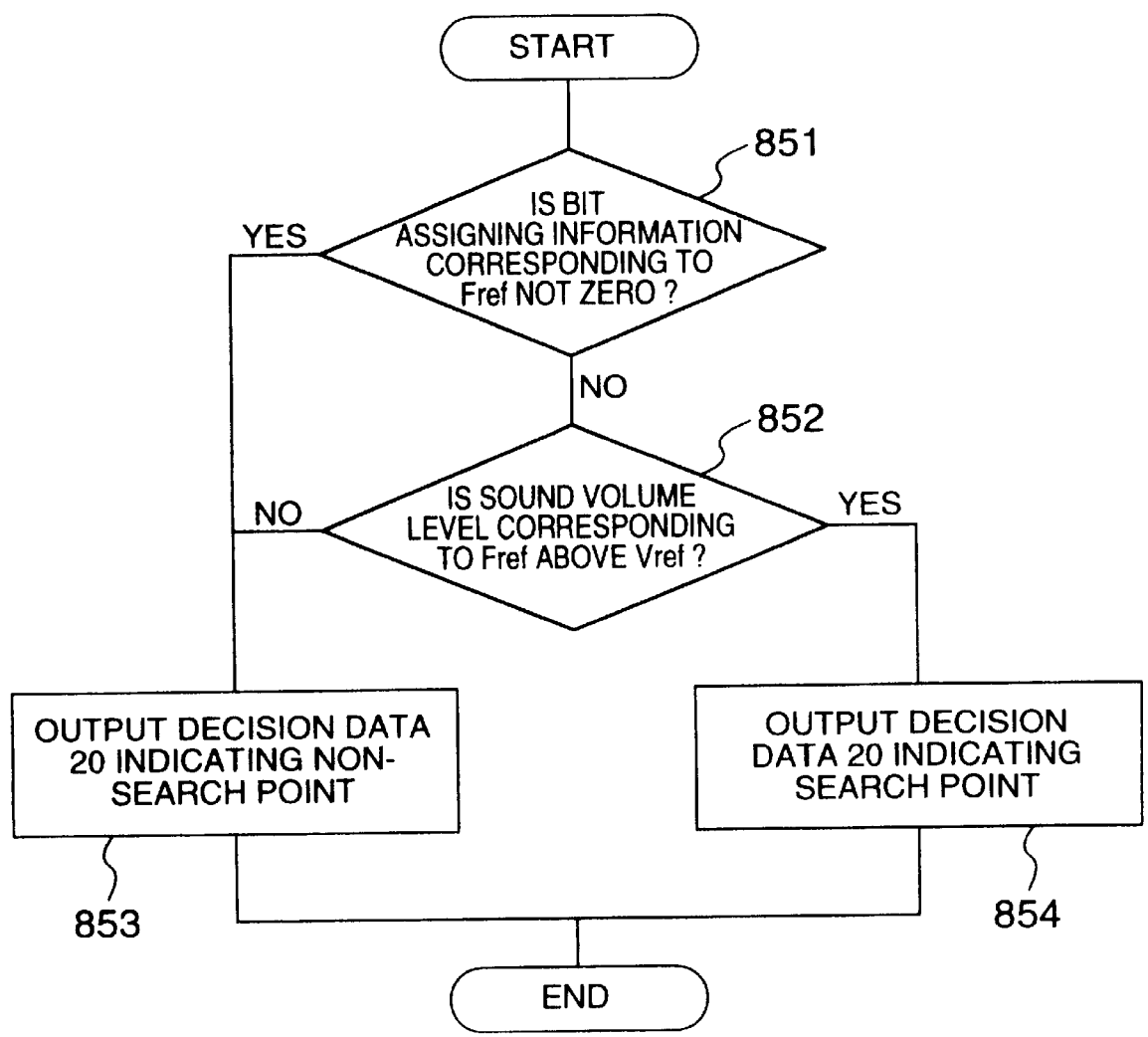
FIG. 12 a flow chart for explaining the operation of a voice feature deciding unit in the present invention.

In the example of the eruption of volcano, the process can be realized as shown in FIG. 12 where Fref represents the frequency corresponding to an eruptive sound and Vref represents the reference level of the sound.

Firstly, in step 851, bit assigning information corresponding to Fref is decided as to whether to be zero.

If YES (zero), the program proceeds to step 853 in which decision data 20 (for example, logical value "0") indicating that the detected data is non-search point for voice is delivered and the program ends. If NO (not zero), the program proceeds to the next step 852 in which the sound volume level corresponding to Fref is decided as to whether to exceed Vref. If NO (below Vref), the program proceeds to the step 853 in which it is indicated that the detected data is not at a search point for voice and the program ends. If YES (above Vref), the program proceeds to the step 854 in which decision data 20 (for example, logical value "0") indicating that the detected data is at a search point for voice is delivered and the program ends.

Next, the operation of the search point deciding unit 25 will be described. In this example, a search point for moving image and a search point for voice are indicated by logical value "1" of decision data 15 and logical value "1" of decision data 20, respectively, and these data are combined together to provide the following decision data 21 adapted to an application. In the w, "0" and "1" of the decision data 21 on-search point and a search point, respectively.

EXAMPLE 1

The case where the result of logical ANDing of the decision data 15 and the decision data 20 is used as the decision data 21.

| DECISION DATA 21 | DECISION DATA 15 | DECISION DATA 20 |
| --- | --- | --- |
| 0 | 0 | 0 |
| 0 | 0 | 1 |
| 0 | 1 | 0 |
| 1 | 1 | 1 |

EXAMPLE 2

The case where the result of logical ORing of the decision data 15 and the decision data 20 is used as the decision data 21.

| DECISION DATA 21 | DECISION DATA 15 | DECISION DATA 20 |
| --- | --- | --- |
| 0 | 0 | 0 |
| 1 | 0 | 1 |
| 1 | 1 | 0 |
| 1 | 1 | 1 |

In an alternative, an example taking a temporal factor into account may be considered depending on an application.

The decision data 21 produced as above is delivered to the hard disk control unit 5 to ensure automatic search.

As described above, in the present invention, the automatic search for a search point can be permitted through a simple analysis of coded data without decoding the moving image coded data and voice coded data. Further, by virtue of the voice coded data taken into consideration, more accurate execution of automatic search can be ensured.

In addition, the present invention can also be utilized for automatic detection of a search point position. More specifically, this can be realized when the movement from S1 to S2 included in the operation of FIG. 3 by the hard disk control unit 5 is not carried out in accordance with a command by the operator but is carried out automatically. Through this, the position of a search point can be detected automatically in advance in connection with the voice/moving image compressed data in the hard disk and position information of a detected search point can additionally be recorded on the hard disk and when the operator performs retrieval, instantaneous access to the search point can be effected on the basis of the recorded search point position information. Obviously, in the previously-described automatic search command retrieval by the operator, too, a detected search point result may be recorded for the next retrieval.

Further, in the image display of a search point, a plurality of images can be monitored or displayed at a time in the form of small images. This permits easier grasp of the contents of coded data.

It will be appreciated that the following well known three kinds of pictures described in ISO/IEC 13818 are used for coding in the aforementioned MPEG2:

I picture (Intra-coded picture)

P picture (Predictive-coded picture)

B picture (Bidirectionally predictive-coded picture).

These pictures can be used mainly in combination as follows:

(1) Only I picture (2) I and P pictures (3) I, P and B pictures

In this case, even when images of the same complexity are processed with the same quantizing step value, it is known that the code quantities are proportioned in accordance with the kind of the above pictures as follows: (The ratio is exemplified in relation to a general image)

I picture code quantity:P picture code quantity:B picture code quantity=7:3:2

Accordingly, operation results of complexity C pursuant to the aforementioned equation (2) can be compared for different pictures by performing scaling based on the above ratio. But, in general, the I picture is a picture which is accessible randomly and therefore, a comparison of complexity between only I pictures is practical in some systems.

In the previously-described specific example of FIG. 4 the hard disk control unit 5 is realized with the CPU but the present invention permits detection of a search point through the simple operation process and therefore the picture code quantity detecting unit 10, picture coding process parameter detecting unit 11, picture feature deciding unit 14, voice coding process parameter detecting unit 17, voice feature deciding unit 19 and search point deciding unit 25 can also be realized with the CPU of the hard disk control unit 5.

Figure 13:
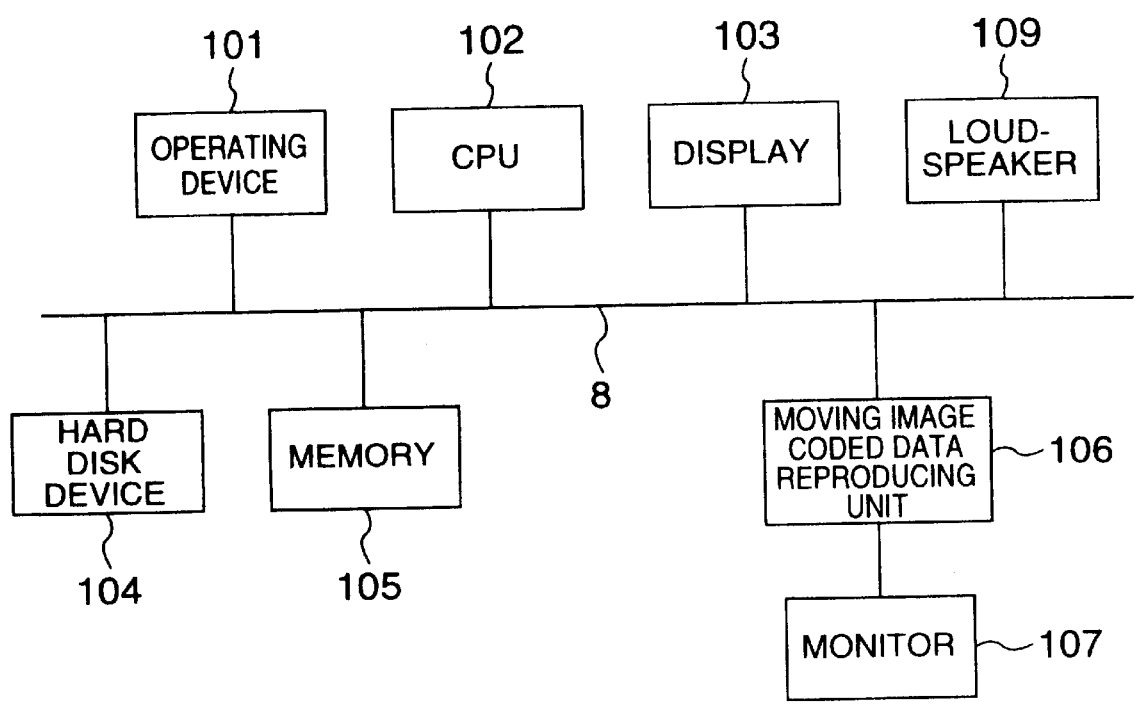
FIG. 13 is a block diagram showing another embodiment of the voice/moving image retrieving apparatus according to the present invention.

Referring now to FIG. 13, another embodiment of the voice/moving image retrieving apparatus according to the present invention will be described.

As shown in FIG. 3, the voice/moving image retrieving apparatus is constructed based on a general personal computer or work station.

In FIG. 13, an operating device 101 corresponds to a keyboard or a mouse which is operated by an operator to input a command. A response to the input is displayed on a display 103. A CPU 102 executes programmed processes of the picture code quantity detecting unit 10, picture coding process parameter detecting unit 11, picture feature deciding unit 14, voice coding process parameter detecting unit 17, voice feature deciding unit 19, search point deciding unit 25 and voice coded data reproducing unit 23 which are shown in FIG. 1. A memory 105 is a work memory necessary for realizing the programmed processes. A hard disk device 104, a moving image coded data reproducing unit 106, a monitor 107 and a loudspeaker 109 are similarly constructed to those of FIG. 1.

Depending on the type of system, what is to be displayed on the monitor 107 may be displayed on the display 103 and the monitor 107 may be unneeded.

While in the foregoing embodiments the processing for the stored voice/moving image coded data has been described, the present invention may also be utilized for voice/moving image coded data transmitted in a real time fashion. In this case, it will be conceivable that an alarm, for example, is raised at the time that a search point is determined to urge a supervisor to pay attention and search point information is recorded together with voice/moving image coded data in a real time fashion and is utilized for subsequent retrieval.

According to the present invention, in the retrieval of voice/moving image coded data, a part suitable for deciding the contents of coded data can be searched automatically without resort to visual recognition of all of contents by the operator and therefore, work load imposed on the operator can be mitigated greatly and the contents can be decided at a high speed. Also, an artificial mistake due to visual recognition can be prevented.

Further, since a point to be searched is decided from a voice and a moving image, the automatic search can be practiced more accurately and in designated various combinations.

In addition, a search point can be decided without decoding each coded data piece of voice/moving image and therefore the amount of operation processes and the circuit scale can be reduced greatly, thus providing highly efficient and highly accurate voice/moving image retrieving method and apparatus.

What is claimed is:

1. A method for retrieval of voice coded data and moving image coded data which retrieves at least one of voice compressed data and moving image compressed data recorded on a recording/reproducing device, comprising the steps of:

sequentially reading the voice compressed data and moving image compressed data from said recording/reproducing device at a high speed;

detecting code quantities and coding process parameters of individual pictures in said moving image compressed data to analyze a feature of each picture;

detecting coding process parameters of individual audio frames from said voice compressed data to analyze a feature of each voice;

deciding, on the basis of analysis results of features of each picture and each voice, whether the voice compressed data and moving image compressed data are required to be subjected to standard reproduction;

when at least one of the voice compressed data and moving image compressed data is determined to be subjected to standard reproduction, controlling said recording/reproducing unit such that corresponding voice compressed data and moving image compressed data are read at a standard speed; and decoding and delivering the read-out voice compressed data and moving image compressed data.

2. A voice and moving image coded data retrieving method according to claim 1 further comprising the step of restarting said step of sequentially reading said voice compressed data and moving image compressed data from said recording/reproducing device at a high speed, in response to a command by an operator to perform next retrieval after the corresponding voice compressed data and moving image compressed data are read at the standard speed and decoded and delivered.

3. A method of retrieving at least one of voice compressed data and moving image compressed data recorded on a recording/reproducing device, comprising:

a first step of sequentially reading the voice compressed data and the moving image compressed data from said recording/reproducing device;

a second step of detecting code quantities and coding process parameters of individual pictures in the read-out moving image compressed data to analyze a feature of each picture;

a third step of detecting coding process parameters of individual audio frames from the read-out voice compressed data to analyze a feature of each voice;

a fourth step of deciding, on the basis of results of analysis of features of each picture and each voice, whether each picture and each voice are required to be subjected to standard reproduction; and a fifth step of controlling said recording/reproducing device each time that at least one of a voice and a picture is determined to be subjected to standard reproduction such that position information of a search point of corresponding compressed data is written into said recording/reproducing device.

4. A voice and moving image compressed data retrieving method according to claim 3 further comprising:

a sixth step of controlling said recording/reproducing device, after said fifth step is executed for desired all voice and moving image compressed data, such that voice and moving image compressed data corresponding to voices and pictures required to be subjected to standard reproduction are sequentially read at the standard speed; and a seventh step of decoding and delivering the read-out voice and moving image compressed data pieces.

5. An apparatus for retrieval of voice coded data and moving image coded data which retrieves the contents of at least one of voice coded data and moving image coded data, comprising:

a recording/reproducing device which records a plurality of voice compressed data and a plurality of moving image compressed data;

a voice and moving image coded data reproducing unit which decodes and reproduces said voice and moving image compressed data;

a picture code quantity detecting unit which detects code quantities of individual pictures from said moving image decoded data;

a picture coding process parameter detecting unit which detects coding process parameters of the individual pictures from said moving image coded data;

a picture feature deciding unit which receives outputs of said picture code quantity detecting unit and said picture coding process parameter detecting unit to decide a feature of each picture;

a voice coding process parameter detecting unit which detects coding process parameters of individual audio frames from said voice compressed data;

a voice feature deciding unit which receives the output of said voice coding process parameter detecting unit to decide a feature of each voice;

a search point deciding unit which decides, on the basis of decision outputs of said feature deciding unit and said voice feature deciding unit, whether the retrieved data is a point to be searched; and a recording/reproduction control unit which controls access to said recording/reproducing device on the basis of a decision output of said search point deciding unit.

6. A voice and moving image coded data retrieving apparatus according to claim 5, wherein said picture coding process parameter detecting unit detects a quantizing step value of each picture.

7. A voice and moving image coded data retrieving apparatus according to claim 5, wherein said voice coding process parameter detecting unit detects bit assigning information and a scale factor of each audio frame.

8. A voice and moving image coded data retrieving method according to claim 5, wherein said picture code quantity detecting unit, picture coding process parameter detecting unit, picture feature deciding unit, voice coding process parameter detecting unit, voice feature deciding unit and search point deciding unit are realized with a processor.

9. A method of using a processor to perform retrieval of voice compressed data and moving image compressed data sequentially read out of a recording/reproducing device at a high speed, comprising the steps of:

detecting code quantities and coding process parameters of individual pictures in said read-out compressed data to analyze a feature of picture;

detecting coding process parameters of individual audio frames from said read-out voice compressed data to analyze a feature of each voice; and deciding, on the basis of results of analysis of each picture and each voice, whether at least one of a voice and a picture is required to be subjected to standard reproduction.

* * * * *